Dec. 22, 1953 J. F. JOY 2,663,143
MATERIALS HANDLING APPARATUS
Filed May 11, 1949 6 Sheets-Sheet 1
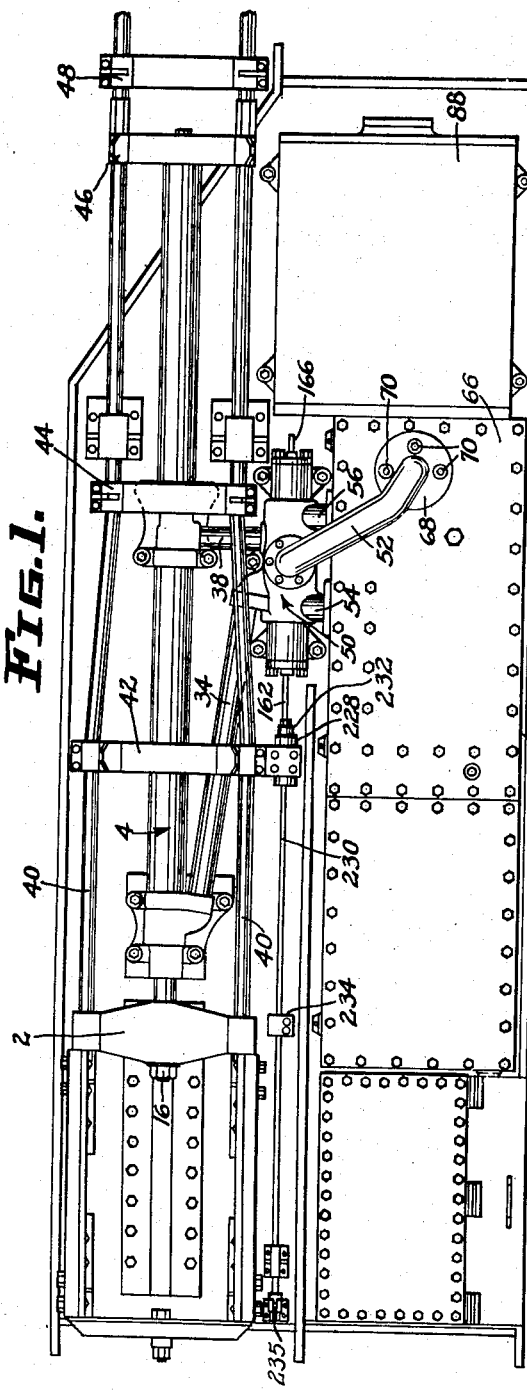
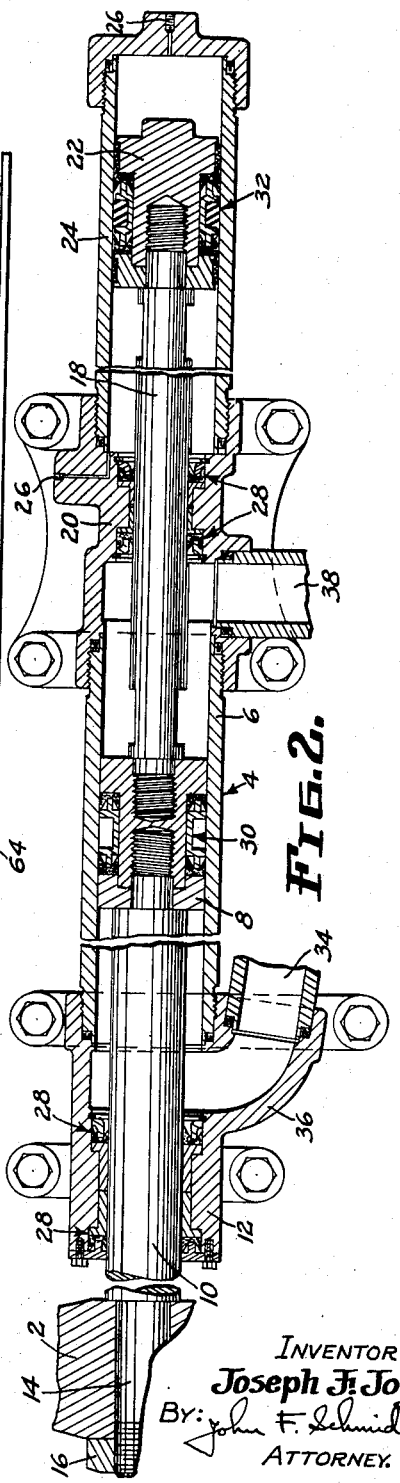
INVENTOR:
Joseph F. Joy.
By: John F. Schmidt
ATTORNEY.

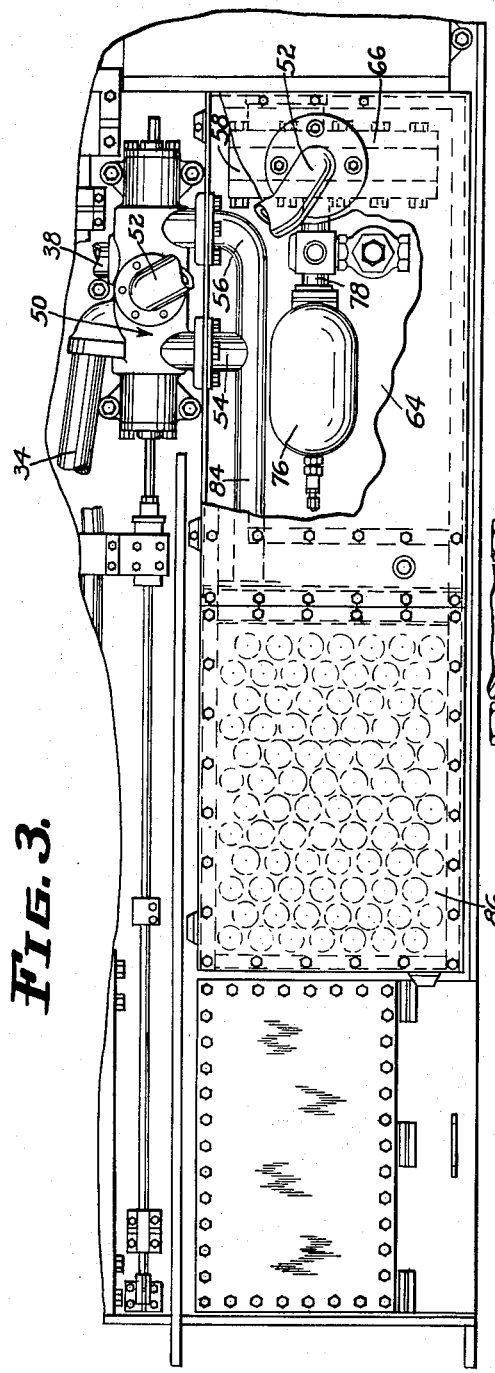
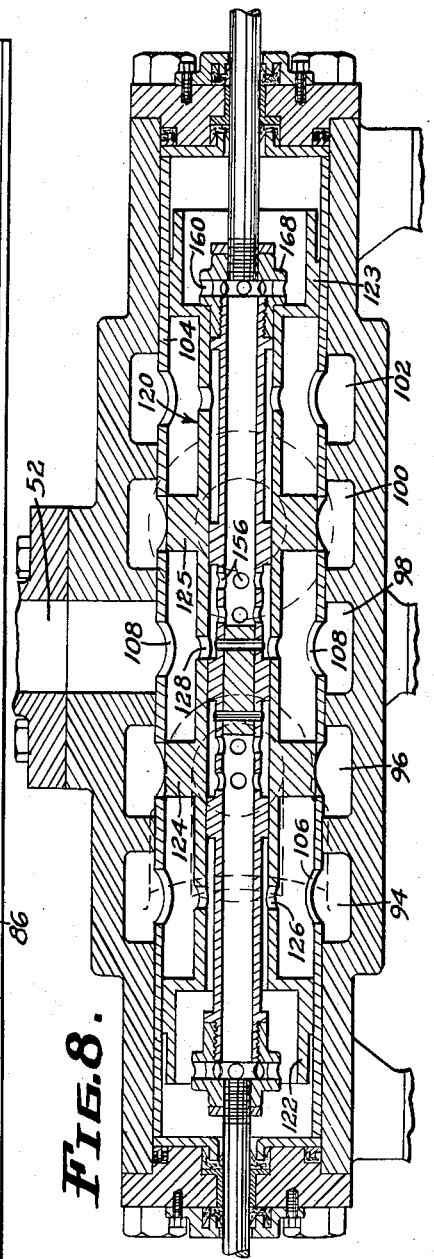
INVENTOR:
Joseph F. Joy.
BY: John F. Schmidt
ATTORNEY.

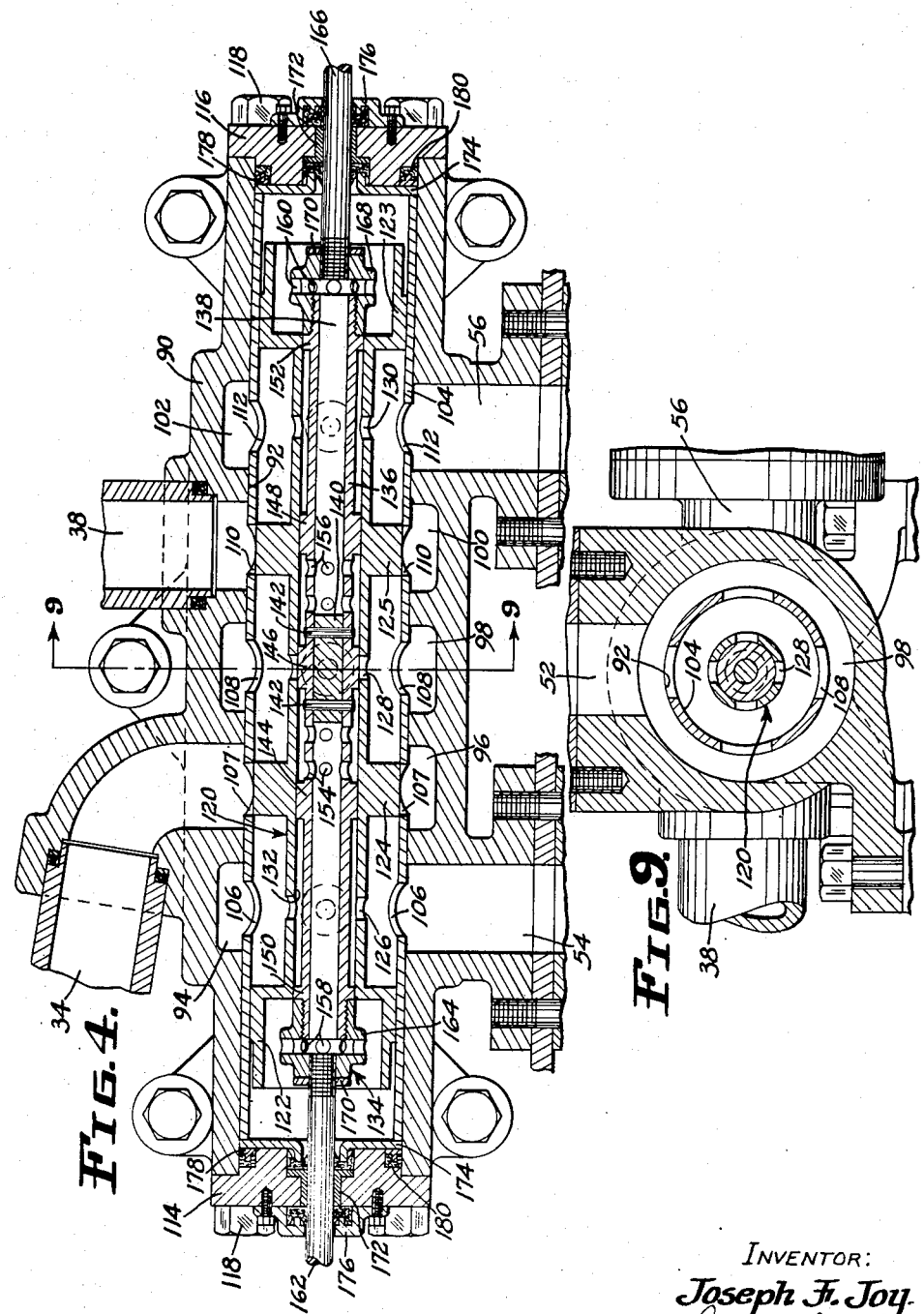

Dec. 22, 1953     J. F. JOY     2,663,143
MATERIALS HANDLING APPARATUS
Filed May 11, 1949     6 Sheets-Sheet 4
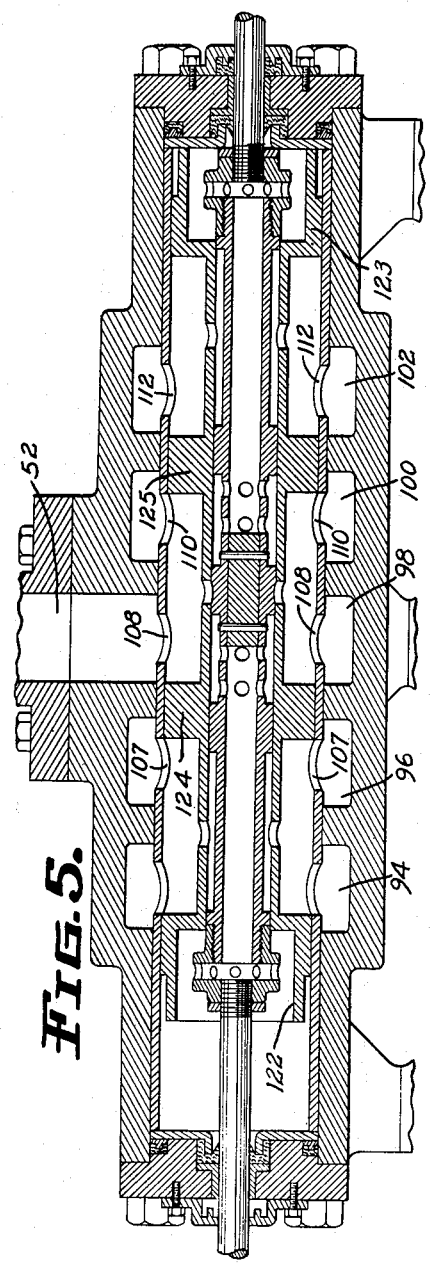
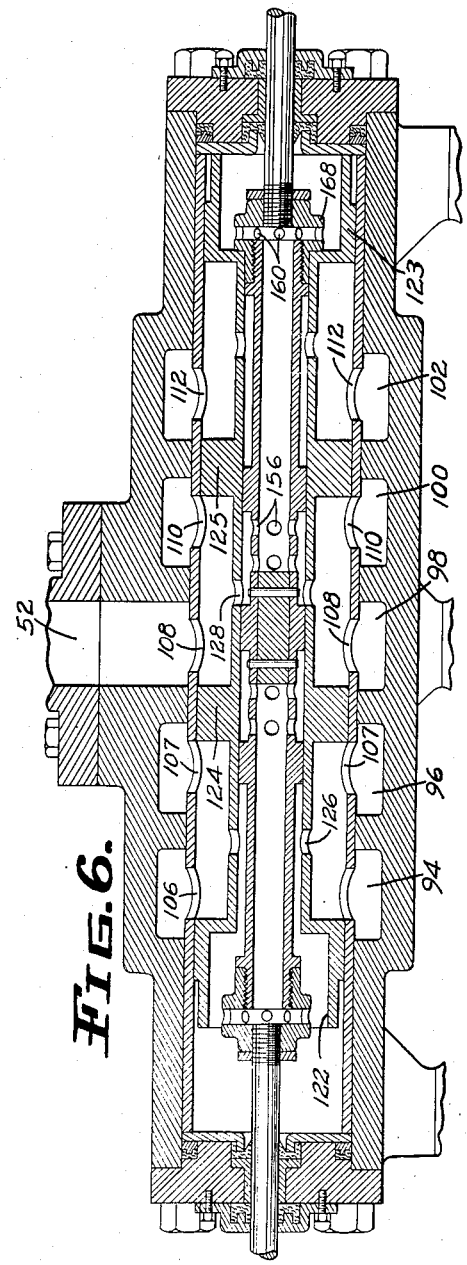
INVENTOR:
Joseph F. Joy.
BY: John F. Schmidt
ATTORNEY.

Dec. 22, 1953 J. F. JOY 2,663,143
MATERIALS HANDLING APPARATUS
Filed May 11, 1949 6 Sheets-Sheet 5

INVENTOR.
Joseph F. Joy.
BY: John F. Schmidt
ATTORNEY.

Dec. 22, 1953 J. F. JOY 2,663,143
MATERIALS HANDLING APPARATUS
Filed May 11, 1949 6 Sheets-Sheet 6
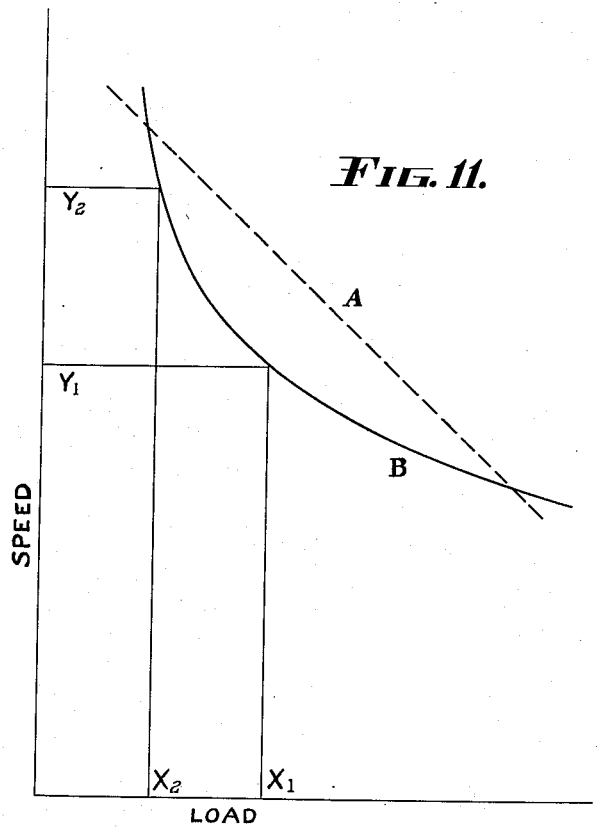
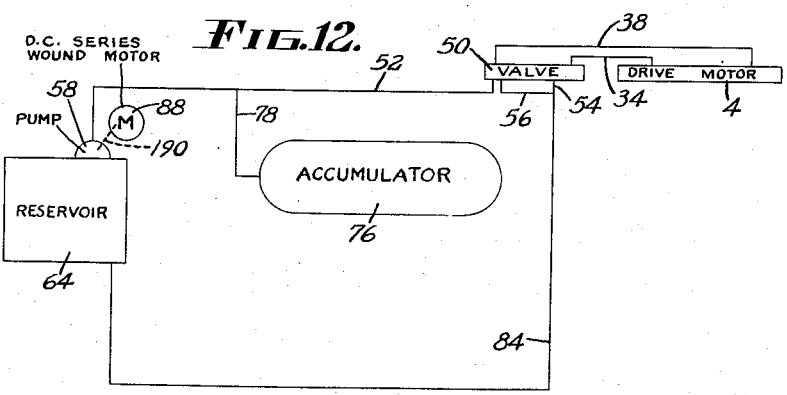
INVENTOR:
Joseph F. Joy.
BY: John F. Schmidt
ATTORNEY.

Patented Dec. 22, 1953

2,663,143

UNITED STATES PATENT OFFICE 2,663,143

MATERIALS HANDLING APPARATUS

Joseph F. Joy, Pittsburgh, Pa., assignor to Joy Manufacturing Company, Pittsburgh, Pa., a corporation of Pennsylvania Application May 11, 1949, Serial No. 92,581

4 Claims. (Cl. 60—51)

This invention relates to shaker conveyors, especially to hydraulically driven shaker conveyors of a simplified design.

In shaker conveyors the problem is to keep the material in motion, and this problem arises because the conveyor must operate through a return stroke during which no forward momentum is imparted to the material being conveyed. It is highly desirable to give the material a high forward velocity during the working stroke in order that it may remain in motion during the return stroke of the conveyor, and to keep the time duration of the return stroke to a minimum because the return stroke represents lost time in the operating cycle. The solution of this problem often entails the design of rather complex and expensive mechanisms.

It is, therefore, an object of this invention to provide a more efficient shaker conveyor of a simple design and having a long stroke which can impart a high velocity to the transported material during the working or forward stroke such that the material continues its forward motion during the very rapid return stroke and until the conveyor again moves forward to impart motion to the material.

This and other objects are achieved in a simplified design of hydraulic shaker conveyor which is provided with a reversible hydraulic motor to which fluid is supplied by a pump which in turn is driven by a variable speed motor, the motor being such that its speed increases markedly with a reduction in load. An accumulator is desirably provided in the fluid supply line from the pump to serve as a pressure fluid reservoir storing up fluid under pressure when the demand by the hydraulic motor is less than pump capacity and delivering such stored fluid when demand is greater than pump capacity.

The reversible motor comprises a cylinder having a piston reciprocable therein, and fluid supply thereto is effected through a unique reversing valve which is itself controlled by the position of the conveyor drive head.

As will be understood by those skilled in the art, a shaker conveyor made according to this invention has great utility in application to coal mining although, of course, the utility of such a conveyor is not limited to that application.

In the drawings:

Fig. 1 is a top plan view of a shaker conveyor drive head and associated mechanism made according to the invention, with the shaker pans removed.

Fig. 2 is a view in section through the longitudinal axis of the drive cylinder comprising the hydraulic motor.

Fig. 3 is a view somewhat similar to Fig. 1 but on a larger scale and with parts broken away to show certain details not shown in Fig. 1.

Fig. 4 is a longitudinal sectional view through the reversing valve showing the valve in a neutral position.

Fig. 5 is another longitudinal sectional view of the reversing valve but with the plane of the section being perpendicular to the plane of the section of Fig. 4 and showing the valve in another operating position.

Fig. 6 is a view similar to Fig. 5, showing the valve in an operating position in which fluid is admitted to one end thereof to shift the valve to another operating position.

Figs. 7 and 8 are sectional views similar to Fig. 5 but showing the valve in other operating positions.

Fig. 9 is a view in section on line 9—9 of Fig. 4.

Fig. 11 is a graph showing the desired performance characteristics of a motor of the type which is to be used as the pump drive motor; and Fig. 12 is a schematic diagram of the hydraulic circuit of a shaker conveyor head made according to the invention.

Figure 7:
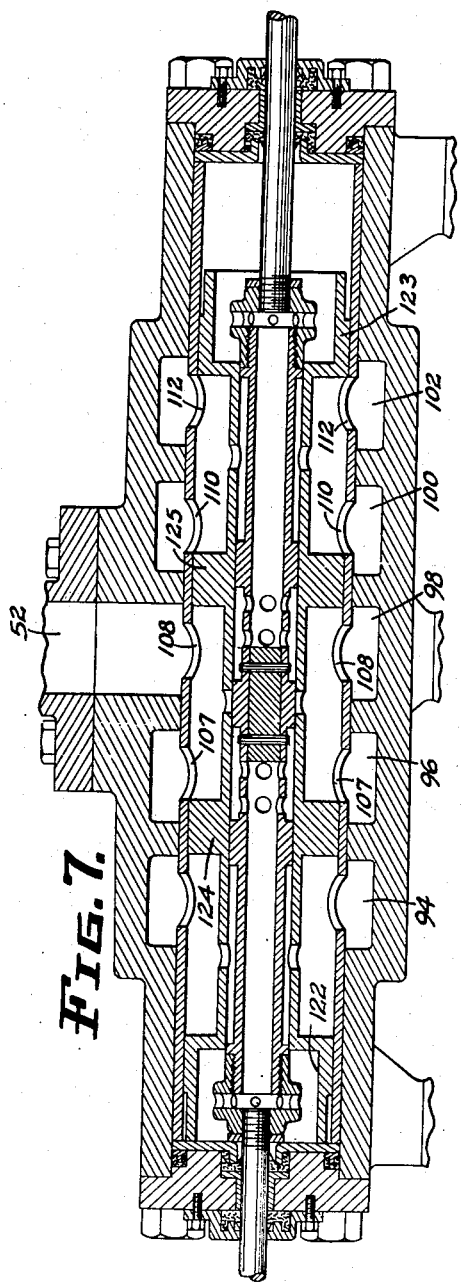

Referring now in detail to the drawings, a crosshead 2 is mounted for reciprocation by a fluid-operated motor 4. As is best seen in Fig. 2, fluid motor 4 comprises a cylinder 6 and an operating piston 8. A piston rod 10 extends through suitable packing in the stuffing box 12 and connects with the crosshead 2 by means of a reduced diameter portion 14 at the end of piston rod 10 and a threaded member 16 on the end of the reduced diameter portion 14.

At the end of piston 8 opposite piston rod 10 there is mounted a guide rod 18 which extends through a stuffing box 20. Guide rod 18 carries a piston 22, which operates in a cylinder 24. Cylinder 24 is preferably pressurized, i. e., charged with nitrogen or air and serves as a buffer to cushion the stopping of the main drive piston 8 at the end of each stroke. In order to permit the charging of cylinder 24 at opposite sides of the piston 22, cylinder 24 is provided with connections 26. The left end of cylinder 24 is preferably charged to a higher pressure to assist in giving the crosshead 2 the faster acceleration desired on the return stroke.

It will be understood by those skilled in the art that suitable packing indicated generally at 28 will be used in the stuffing boxes 12 and 20, and also that suitable sealing means indicated generally at 30 and 32 will be provided for the pistons 8 and 22 respectively. The details of the packing and sealing means do not per se form a part of this invention, and are, therefore, not described herein.

A pressure-fluid conduit 34 is connected to supply fluid to one end of the cylinder 6 of motor 4 through a connection 36. A second pressure-fluid conduit 38 is connected to supply fluid under pressure to the opposite end of cylinder 6. It will be noted that piston rod 10 is larger in diameter than guide rod 18, so that for a given pressure of fluid supplied to the cylinder at a given rate, piston 8 will move faster to the right, as seen in Fig. 2, than it will to the left.

It may be noted here that the crosshead 2 is connected by drive rods 40 with pan brackets 42, 44, 46 and 48. The details of these pan brackets and their connections with the drive rods 40 are disclosed and claimed in patent application Serial No. 73,625, filed January 29, 1949.

The supply of pressure fluid to the fluid motor 4 is controlled by a reversing valve indicated generally at 50. Fluid under pressure is supplied to reversing valve 50 through a conduit 52, and fluid flows from the valve through two low-pressure fluid connections 54 and 56.

Fluid under pressure is supplied to valve 50 through the aforesaid high-pressure fluid conduit 52 by means of a pump 58. Pump 58 is preferably mounted in a fluid reservoir 64 with its intake submerged or immersed in hydraulic fluid. This mounting is effected by securing the pump casing to the cover 66 of the fluid reservoir by any suitable means such as a flanged connection 68, which communicates directly with the pump outlet or discharge, and the pump is secured to the under side of the reservoir cover 66 by means of threaded members 70 passing through the flanged connection 68 and engaging threaded openings in the pump casing. The flanged connection 68 extends through an opening in the reservoir cover 66 and the top of the pump casing abuts directly against the lower face of the flanged connection 68. The details of this connection are more clearly shown in application Serial No. 73,625, filed January 29, 1949.

An accumulator of the enclosed bladder type, such as is disclosed in Patent 2,256,835, is shown at 76. Accumulator 76 communicates with fluid conduit 52 by means of a conduit 72.

The two low pressure fluid connections 54 and 56 empty into a discharge conduit 84 which conducts the exhaust fluid to a filter 86 through which the hydraulic fluid passes before it is recirculated through the system. It will be noted that for the sake of convenience, accumulator 76 and its associated connections with the system are mounted in the reservoir 64.

Pump 58 is connected to be driven by a motor 88 which has performance characteristics such that the motor speed increases sharply with a decrease in load. The desired characteristics are shown in the graph in Fig. 11, in which curve A gives a straight-line speed-load relationship. The preferred relationship would be that shown as curve A, but such performance characteristics may be unattainable as a matter of practice. It may be necessary, for example, to use a drive motor havnig the speed-load relationship shown in curve B, which is the performance curve of a typical D. C. series-wound motor. In that case, it will be desirable to use a motor such that the normal speed variations will occur along a steep portion of the curve.

The reversing valve

The reversing valve will now be described in detail, special reference being had to Figs. 4 to 10. A substantially cylindrical shell 90 is provided with an internal bore 92 and a plurality of internal peripheral grooves 94, 96, 98, 100 and 102. The peripheral grooves communicate respectively with low pressure fluid connection 54, pressure-fluid conduit 34, high pressure fluid connection 52, pressure-fluid conduit 38, and low pressure fluid connection 56. If desired, the valve could be made with the peripheral grooves communicating directly with the bore, but a preferred form of construction is that shown, in which a sleeve 104 snugly fits the bore 92 of the shell 90.

Sleeve 104 is provided with a plurality of sets of ports 106, 107, 108, 110 and 112, which communicate respectively with peripheral grooves 94, 96, 98, 100 and 102. Thus, in the preferred embodiment of the invention, communication between two or more peripheral grooves is by way of the interior of sleeve 104 and the associated ports. The sleeve 104 is removably secured in bore 92 by means of end caps 114 and 116. These caps are held in place by any suitable means such as threaded members 118 passing through the end caps and engaging the shell 90.

A hollow elongated main valve member 120 is reciprocably mounted in the sleeve 104. Main valve member 120 is provided with end pistons 122 and 123 and a plurality of port closers 124 and 125 between the end pistons. In the embodiment shown, the end pistons and port closers are of substantially the same external diameter as, and cooperate with, the inside diameter of the sleeve 104 to open and close certain of the sleeve ports. As is best seen in Fig. 4, port closers 124 and 125 preferably have a dimension in the axial direction which is sufficient to close a port when the port 8 closer is aligned therewith. It will be noted further that the main valve member 120 is itself provided with ports 126, 128 and 130. When the valve is in the central position shown in Fig. 4 these ports are aligned with ports 106, 108 and 112 respectively.

It was pointed out above that the main valve member 120 is hollow. This hollow consists of an internal bore 132 in which a pilot valve member indicated generally at 134 is mounted for reciprocation. The pilot valve member consists of a hollow elongated element 136, of which the hollow 138 is blocked substantially midway between its ends by a plug 140 held in place by means of pins 142.

Figure 10:
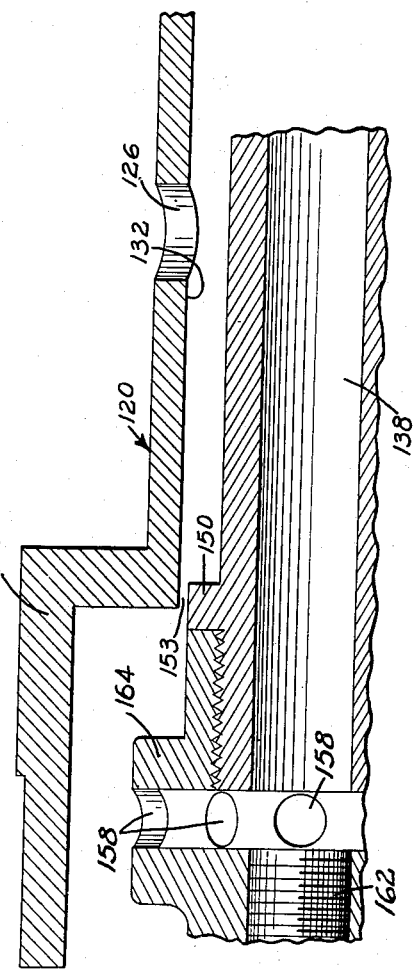
Fig. 10 is an enlarged detail view of a portion of the valve as shown in Fig. 7, but on a scale approximately four times that of Fig. 7.

The elongated element is provided at its exterior with port closers 144, 146 and 148. These port closers are in effect pistons which fill up the internal bore 132 of the main valve member and thus serve to block fluid passage in an axial direction through the main valve member. In addition, the elongated element is provided with end pistons 150 and 152 which also have an external diameter such as to be reciprocable in and substantially block the internal bore 132 of the main valve member. As is best seen in Fig. 10, the end pistons 150 and 152 are preferably somewhat smaller than bore 132 to provide a clearance 153 and to permit a throttling effect in operation. The hollow elongated element of the pilot valve member is further provided with ports or fluid passages 154 and 156 at opposite sides of the plug 140 and with radial fluid passages 158 and 160 at its ends.

An actuating rod 162 threadedly engages the end 164 of the pilot valve member and a guide rod 166 threadedly engages the opposite end 168 of the pilot valve member. A suitable lock nut 170 engages the threaded portions of rods 162 and 166 to guard against loosening of the threaded connections. As will be well understood by those skilled in the art, the rods 162 and 166 pass through stuffing boxes 172, of which the packing and gland are secured between a flanged member 174 and a stuffing box cap 176. The flanged member 174 engages an end of sleeve 104 and also serves to hold a seal 178 in place in annular recess 180 provided in each of end caps 114 and 116.

The pilot valve actuating means

The pilot valve member of the reversing valve must be actuated by some means in order to effect reversal of the fluid operated motor. The pilot valve is actuated by reciprocation of the shaker conveyor drive head as will now be described in greater detail.

Pan bracket 42 (Fig. 1) carries an extension at its one end, to which there is secured a block 228. The block 228 is hollow to permit the passage therethrough of actuator rod extension 230. Extension 230 is threadedly connected at its one end to a dog 232, which in turn is threaded onto the end of actuator rod 162. Rod extension 230 carries another dog 234 which is adjustable along the rod in order to vary the length of stroke of the shaker conveyor. A handle 235 is preferably attached to rod 230 in order that the pilot valve member may be moved manually into a valve actuating position from the neutral position shown in Fig. 4, just in case the apparatus should shut down with the parts in neutral.

Operation

For a quick summary of the operation, reference should be made to Fig. 12. The pump inlet is immersed in hydraulic fluid in the reservoir and discharges fluid into the high pressure fluid connection 52. The reversing valve admits fluid first to one end of the drive motor 4 and then to the other end of drive motor 4. Fluid discharged from the drive motor passes through the reversing valve and returns to the reservoir by way of return line 84 (passing also through the filter 86 shown in Fig. 3).

At the beginning and end of each stroke the output of pump 50 is greater than the demand for hydraulic fluid by the fluid-operated motor, in this case the drive motor 4. When the fluid-operated motor is moving at maximum speed in either direction, the requirement for hydraulic fluid is greater than the capacity of the pump. When the demand for fluid is less than pump capacity, the excess is stored in accumulator 76 and when the demand for fluid is greater than pump capacity, accumulator 76 discharges fluid into high pressure fluid connection 52.

Referring now especially to Figs. 2 and 11, when fluid is admitted to the right end of cylinder 6 by way of conduit 38, the conveyor moves toward the left as seen in Fig. 2, carrying coal or other material away from the mine face. During this part of the cycle, the pump and drive motor are heavily loaded, and the motor and pump speed are such as to move the pan line and coal along without sliding of the pans with respect to the coal. The load is a value $X_1$ (Fig. 11) and the speed is value $Y_1$. When high-pressure fluid is admitted to the left end of cylinder 6 by way of conduit 34, the pan line moves under the coal toward the right, whereupon the motor 88 is less heavily loaded, the load condition being that shown at $X_2$ in Fig. 11. With a load $X_2$, motor speed is $Y_2$, which is appreciably higher than speed $Y_1$ of the motor on the working stroke.

A slow working stroke and a relatively high-speed return or idler stroke is what is required in apparatus of this type, and these operating characteristics are achieved with a drive motor having performance characteristics such as shown in Fig. 11.

These desired operating characteristics are accentuated by the use of a piston rod 10 which is larger than guide rod 18, so that, for a given volume and pressure of fluid delivered to motor 4, piston 8 will move faster to the right (idler stroke) than to the left (working stroke). It will be understood by those skilled in the art that, with a drive motor 88 having the speed-load characteristics discussed above, fluid will be delivered to motor 4 at a faster rate on the idler stroke than on the return stroke. Thus the motor performance characteristics and the design of hydraulic drive motor 4 combine to give a fast return stroke and a relatively slow working or delivery stroke.

A further contribution to this desideratum is provided in the design of cylinder 24. As was explained above, cylinder 24 has reciprocating therein a piston 22, which is connected to guide rod 18 and moves against air or nitrogen under pressure in cylinder 24 at both sides of the piston 22. Cylinder 24 thus stores up energy which is put back into the system when piston 8, and therefore, piston 22, have reached the end of a stroke and move in the other direction, serving to start movement immediately in said other direction. Because of the higher pressure on the left side of piston 22, the acceleration will be greater on the return stroke.

In addition, cylinder 24 serves as a shock absorber to slow down the shaker conveyor drive head near the end of each stroke by compressing the gas in that end of cylinder 24 toward which piston 22 happens to be moving.

The operation of the fluid-operated motor and the reversing valve will now be taken up in greater detail. Let it be assumed that the description of the operation begins with the main valve member and the pilot valve member at the extreme right limits of travel (Fig. 5). Let it further be assumed that the cross-head 2 is nearing the end of its travel toward the left as seen in Fig. 1. As it nears the end of its leftward travel the block 228 engages dog 234 and pulls the pilot valve member leftward into the operating position shown in Fig. 6. Thereupon, fluid under high pressure is admitted from the high pressure fluid connection 52 into peripheral groove 98, whence it passes through ports 108 in the sleeve 104, ports 128 in the main valve member, into the annular space between the main valve member and the pilot valve member, through ports 156 in the pilot valve member, along the right half of the hollow pilot valve member, and out through radial ports 160 in the end 168 of the pilot valve member, whereupon fluid at high pressure is admitted to the right end of main valve member 120 and also to the right end of the pilot valve member.

Also, with the parts in this position, the left end of the main valve member is open to the low pressure fluid connection 54 by way of the annular passage between the main valve member and the pilot valve member, ports 126 in the main valve member, ports 106 in the sleeve, and annular groove 94. With the high fluid pressure at the right end of the main valve member and the pilot valve member, and low pressure at the left end, the system is unbalanced so far as pressure is concerned. As a result, the main valve member and pilot valve member move rapidly toward the left from the position shown in Fig. 6 into the position shown in Figs. 7 and 10. The pilot valve member will reach the end of its travel first because it is "ahead" of the main valve member, as can be seen in Fig. 6, and as the main valve member nears the end of its travel, end piston 150 enters the end of bore 132. The clearance 153 provides a throttling effect which cushions the stopping of the main valve member. If the main valve member should stick momentarily, it will be started toward the left mechanically by the pilot valve member, as shown in Fig. 8.

It should be remembered that meanwhile the crosshead 2 has reached the end of its stroke in a leftward direction. With the valve parts occupying the relative positions shown in Fig. 7, high pressure fluid passes from the high pressure fluid connection 52 into peripheral groove 98, through ports 108 in the sleeve, into the annular space between the sleeve and the main valve member and between port closers 124 and 125, through ports 107 in the sleeve, into annular groove 96, and out through pressure fluid conduit 34 (Fig. 4) to connection 36 at the left end of cylinder 6. Fluid under high pressure is thereupon admitted to the left side of piston 8.

Meanwhile note that the right side of piston 8 is vented to the low pressure of the reservoir by way of pressure fluid conduit 38, annular groove 100, ports 110 in the sleeve, the annular space between the sleeve and the main valve member and between port closer 125 and piston 123, ports 112, annular groove 102, low pressure fluid connection 56 and exhaust conduit 84. This unbalance of pressures moves the piston 8 rapidly to the right as seen in Fig. 2.

Inasmuch as the valve is symmetrical, the operation in the other direction is the same as the operation just described so the other half of the cycle need not be described in detail, but will be understood by those skilled in the art from the description given above.

It will be evident from the foregoing to one skilled in the art that this invention provides an improved, simplified, and more efficient shaker conveyor having the numerous advantages set forth.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:

1. In a shaker conveyor, in combination, a reversible hydraulic motor having two working faces of different areas in order to provide the characteristics of moving faster in one direction than in the other for a given fluid supply, a reversing valve, a pump, means including conduit means connecting the pump with the reversing valve and the reversing valve with the motor, a series-wound electric drive motor for the pump having a speed-load relationship such that the drive motor speed increases sharply with a decrease in drive motor load, and means charged with gas under pressure and associated with the hydraulic motor to accelerate said motor at the beginning of each stroke, said means having two chambers charged to different pressures such that the acceleration is greater in one direction than in the other direction, and the effects of greater hydraulic motor speed, greater drive motor speed, and greater acceleration being additive.

2. The combination of claim 1, and a hydraulic accumulator connected to the pump.

3. A shaker conveyor comprising: a reversible hydraulic motor of the piston-and-cylinder type, having a drive rod of a given cross-sectional area secured to the piston and extending out through one end of the cylinder, and a guide rod of a lesser cross-sectional area secured to the piston and extending out through the opposite end of the cylinder, whereby fluid supplied at a given rate to the first-named end of the cylinder will move the piston faster than fluid supplied at the same rate to the second-named end of the cylinder; a reversing valve; a fluid supply pump; means connecting the valve with the two named ends of the cylinder; means connecting the pump with the valve; a DC series-wound electric motor connected to drive the pump, said motor having speed-load characteristics such that motor speed increases sharply with a decrease in load; and means charged with gas under pressure and associated with the hydraulic motor to accelerate said motor at the beginning of each stroke, said means having two chambers charged to different pressures such that the acceleration is greater in one direction than in the other direction, and the effects of greater hydraulic motor speed, greater drive motor speed, and greater acceleration being additive.

4. The combination of claim 2, and a hydraulic accumulator connected to the pump.

JOSEPH F. JOY.

References Cited in the file of this patent

UNITED STATES PATENTS

| Number | Name | Date |
|---|---|---|
| 897,676 | Thompson | Sept. 1, 1908 |
| 1,685,760 | West | Sept. 25, 1928 |
| 2,214,755 | Tafel | Sept. 17, 1940 |
| 2,214,817 | Harrington | Sept. 17, 1940 |
| 2,290,479 | Mercier | July 21, 1942 |
| 2,318,065 | De Matia | May 4, 1943 |
| 2,408,303 | Ernst | Sept. 24, 1946 |
| 2,436,986 | Ashbaugh | Mar. 2, 1948 |
| 2,480,527 | Wachter | Aug. 30, 1949 |
| 2,571,359 | Hallenbeck | Oct. 16, 1951 |

FOREIGN PATENTS

| Number | Country | Date |
|---|---|---|
| 522,933 | France | Apr. 8, 1921 |